United States Patent
Freyermuth et al.

(10) Patent No.: US 6,629,480 B1
(45) Date of Patent: Oct. 7, 2003

(54) DEVICE FOR ASSEMBLY OF TOOLS IN TOOL CARRIERS BY THERMAL EXPANSION AND PREADJUSTMENT AND MEASUREMENT OF THE MOUNTED ASSEMBLY

(75) Inventors: Alain Freyermuth, Pfaffenhoffen (FR); Laurent Mallet, Ingwiller (FR)

(73) Assignee: E.P.D., Bouxwiller (FR)

( * ) Notice: Subject to any disclaimer, the term of this patent is extended or adjusted under 35 U.S.C. 154(b) by 104 days.

(21) Appl. No.: 09/718,337

(22) Filed: Nov. 24, 2000

(30) Foreign Application Priority Data

Nov. 26, 1999 (FR) .............................. 99 14946

(51) Int. Cl.$^7$ .............................. B23B 7/00; B23B 9/00
(52) U.S. Cl. .............................. 82/118; 82/133; 33/201
(58) Field of Search .......................... 82/118, 122, 173, 82/151, 152, 900, 903; 33/201, 503, 508, 549, 555, 286, 636, 637, 639; 29/447, 714, 800, 35, 507, 508, 517, 520; 403/28–30, 273, 73; 409/239; 432/224, 225

(56) References Cited

U.S. PATENT DOCUMENTS

| | | | | |
|---|---|---|---|---|
| 2,632,841 A | * | 3/1953 | Wharff | 219/644 |
| 3,050,862 A | * | 8/1962 | Koch | 33/639 |
| 3,518,769 A | * | 7/1970 | Bullard et al. | 33/636 |
| 3,578,868 A | * | 5/1971 | Wopkemeier et al. | 434/360 |
| 3,597,093 A | * | 8/1971 | Wolf | 356/391 |
| 3,676,935 A | * | 7/1972 | Klausing | 33/628 |
| 3,701,199 A | * | 10/1972 | Lewis | 356/138 |
| 4,031,628 A | * | 6/1977 | Kaesemeyer | 33/201 |
| 4,532,716 A | * | 8/1985 | Steiner | 33/201 |
| 4,869,813 A | * | 9/1989 | Bailey et al. | 209/538 |
| 5,035,556 A | * | 7/1991 | Lamotte et al. | 409/218 |
| 5,280,671 A | * | 1/1994 | Marquart | 279/158 |
| 5,655,354 A | * | 8/1997 | Baker et al. | 53/474 |
| 5,933,941 A | * | 8/1999 | Kelly | 269/303 |
| 6,076,254 A | * | 6/2000 | Onodera et al. | 29/447 |
| 6,216,335 B1 | * | 4/2001 | Freyermuth | 356/400 |
| 6,301,007 B1 | * | 10/2001 | Hanlon et al. | 356/400 |
| 2002/0129681 A1 | * | 9/2002 | Ono | 82/1.11 |

FOREIGN PATENT DOCUMENTS

| | | |
|---|---|---|
| DE | 298 20 838 | 4/1999 |
| DE | 100 15 322 A1 * | 3/2000 |
| DE | 1 002 605 A1 * | 5/2000 |
| EP | 0 247 939 | 12/1987 |
| FR | 2 768 071 | 3/1999 |
| FR | 2 768 072 | 3/1999 |

OTHER PUBLICATIONS

Eastman, Martin, Shrink–Fit Toolholding, Apr. 1997, "Cutting Tool Engineering Magazine", vol. 49, No. 3.*

* cited by examiner

*Primary Examiner*—A. L. Wellington
*Assistant Examiner*—Brian D. Walsh
(74) *Attorney, Agent, or Firm*—Young & Thompson

(57) ABSTRACT

The present invention has for its object a device for assembling tools in a tool carrier by thermal expansion and preadjustment and measurement of the mounted assembly.

The device is characterized in that it is essentially constituted by a support frame (1) provided with an interchangeable tool carrying socket (2), by at least one column (3) supporting a dimensional measuring arm (4) and an induction heater (5), by a console (6) for displaying measurements, by a control panel (7) and by a device (8) for precise adjustment of the outwardly extending length of the tool.

The invention is more particularly applicable to the field of the environment of machine tools, in particular digitally controlled machines, machining centers, machines or line transfer, for high speed machining or for which high dimensional precision and concentricity are required.

6 Claims, 2 Drawing Sheets

DEVICE FOR ASSEMBLY OF TOOLS IN TOOL CARRIERS BY THERMAL EXPANSION AND PREADJUSTMENT AND MEASUREMENT OF THE MOUNTED ASSEMBLY

BACKGROUND OF THE INVENTION

The present invention relates to the field of the environment of machine tools, in particular digitally controlled machines, machining centers, machines or line transfer, for high speed machining or for which high dimensional precision and concentricity are required, and has for its object a device for assembling tools in a tool carrier by thermal expansion and preadjustment and for measuring the mounted assembly.

There exist at present different devices permitting assembly by shrinking on of tools in a tool carrier. These shrinking on devices for tool carrier-tool assemblies, with manual or automated intervention for ensleeving, do not however permit, the measuring and precise positioning and control of a tool, and this, in the context of industrial use and preparation of existing tools, is indispensable.

There are also known machines for preadjustment, also called banks of preadjustment or measurement, permitting measuring a tool, but these banks are autonomous and are not generally adapted to shrinking on of tools in tool carriers. As a result, it is necessary to manipulate the tool carrier-tool assemblies several times to have access to the information necessary for good knowledge of said assemblies.

SUMMARY OF THE INVENTION

The present invention has for its object to overcome these drawbacks by providing a device for assembling tools in tool carriers by thermal expansion and preadjustment and measurement of the mounted assembly, permitting the mounting and unmounting of the tools, as well as the precise emplacement in the longitudinal direction or the measurement of the sizes of the tools, and this without moving the assembly thus mounted, in a single operation.

To this end, the device for assembling tools in tool holders by thermal expansion and preadjustment and measurement of the mounted assembly, is characterized in that it is essentially constituted by a support frame provided with an interchangeable tool carrier socket, by at least one column supporting a dimensional measurement arm and an induction heater, by a console for displaying measurements, by a control panel and by a device for the precise adjustment of the outwardly extending length of the tool.

BRIEF DESCRIPTION OF THE DRAWINGS

The invention will be better understood from the following description, which relates to a preferred embodiment, given by way of non-limiting example, and explained with reference to the accompanying schematic drawings, in which.

DESCRIPTION OF THE PREFERRED EMBODIMENTS

Figure 1:
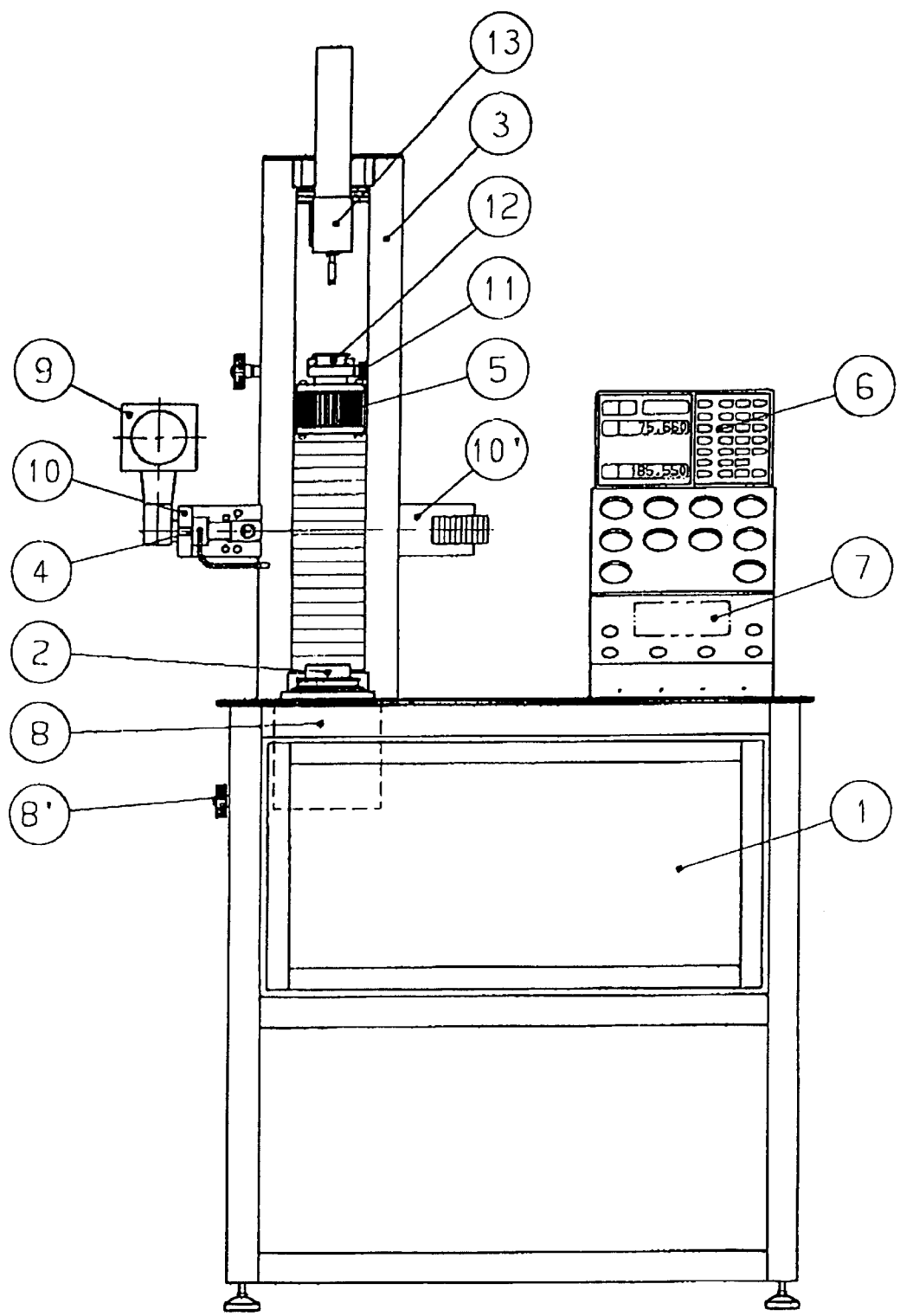
FIG. 1 is a front elevational view of the device according to the invention.
Figure 2:
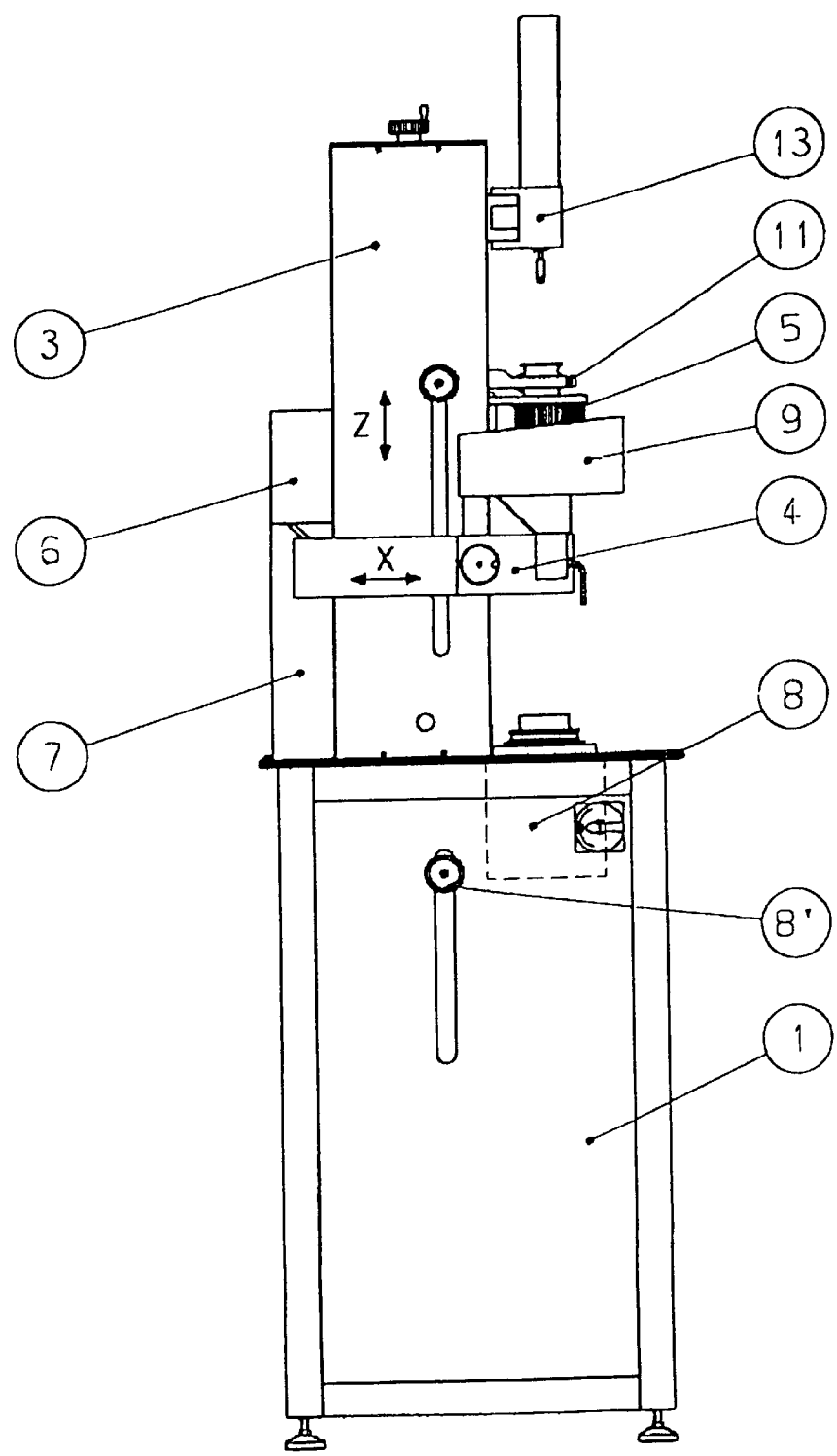
FIG. 2 is a side elevational view of the device according to FIG. 1.

FIGS. 1 and 2 of the accompanying drawings show, by way of example, an assembly device for tools in tool holders by thermal expansion and preadjustment and measurement of the mounted assembly, which is essentially constituted by a support frame 1 provided with an interchangeable tool carrying socket 2, by at least one column 3 supporting a dimensional measuring arm 4 and an induction heater 5, by a console 6 for displaying measurements, by a control panel 7 and by a device 8 for precise adjustment of the outwardly extending length of the tool. In the embodiment shown in FIGS. 1 and 2, the device according to the invention is present in the form of a vertical bank.

The console 6 for displaying measurements and the control panel 7 are preferably fixed laterally to the column 3 on the support frame 1.

The dimension measurement arm 4 is preferably present in the form of a support of a projector or camera assembly 9 and episcopic illumination means 10 or diascopic illumination means 10', or any other device for visualization of a position of a tool, this assembly being mounted movably along the X and Z axes (FIG. 2), which is to say parallel to the axis of the column 3 and perpendicular to this column 3 in the sense of a movement toward or away from planes parallel to this latter, this without the possibility of movement directly into the field of position of the tool carrier and of the tool and in the field of action of the induction heater 5. Thus, the dimensional measurement arm 4 permits moving the visualization device about the tool carrier-tool assembly, without at the same time risking interfering with possible movements of emplacement or retraction of this assembly, nor interfering with the shrinking on operations.

The induction heater 5 is mounted in a known manner, on a slide guided on the column 3 for vertical displacement along the Z axis (FIGS. 1 and 2), this movement, manual or automated, and the corresponding adjustment, being totally independent of the adjustment movements of the dimensional measuring arm 4 and of the projector or camera assembly 9 and episcopic illumination means 10 or diascopic illumination mean 10', or the like.

According to one characteristic of the invention, for the automization of the device, this latter can be completed, as shown more particularly in FIG. 1 of the accompanying drawings, by a shank holder 11 with interchangeable shanks 12. Thus, it is possible to carry. out an automatic supply of the device, on the one hand with tool holders directly in the interchangeable socket 2, and, on the other hand, with tools of different calibers, by coaction with the interchangeable shanks 12 of the shank carrier 11, for example by means of a robotized arm or a slide provided with an extraction gripper, said slide being mounted on the column 3.

In known manner, the portion of the device specific to shrinking on comprises, in addition to the induction heater 5, a retractable ensleeving assembly 13 mounted movably on the column 3, at the upper end of this latter. This ensleeving assembly is adapted to carry out an assisted introduction of the tail of the tool in the tool holder previously heated by induction heating.

The device 8 for precise regulation of the protruding length of the tool, which is not shown in detail in the accompanying drawings, is present preferably in the form of abutment means disposed in the frame 1, of which the control assembly is located below the interchangeable tool holding socket 2 and whose abutment member can extend through this socket into a central hole in the tool carrier, this abutment means being actuable by means of a knob 8' or the like opening on a side or on the surface of said frame 1.

According to one characteristic of the invention, this adjustment device can be a mechanical device with manual drive by the knob 8' However, it is also possible to provide the adjustment device 8 in the form of an electrical or hydraulic drive device, whose actuation is effected by impulses by means of the knob 8'.

Such a device 8 permits precisely adjusting the axial position of the tool, as a function of the positioning elements located by means of the projector or camera assembly 9 and episcopic illumination means 10 or diascopic illumination means 10', or the like, and restored by the console 6 for displaying measurements, the control panel 7 permitting display on said console 6 of the reference values.

The support frame 1 is preferably, in a known manner, in the form of a mechanical-welded structure, on which are fixed respectively the column 3 with the interchangeable tool holding shank 2 and the adjustment device 8 and the control panel 7 with the console 6.

Thanks to the invention, it is possible to provide a machine for shrinking on and for preadjustment as well as measuring a tool holder-tool assembly adapted to a large number of machine tools or machining centers or the like and permitting carrying out, without dismounting, nor intermediate movement, nor changing of adjustment station, the two operations of shrinking on and of preadjustment and measuring.

There results a substantial gain of time for the operation and a simplification of the procedures, the two operations being adapted to be carried out simultaneously at the same work station.

Moreover, the invention also permits obtaining saving space at the workplace because of the combination of the two separation operations, previously carried out by separate machines, but now on a single machine involving a corresponding reduction of the necessary floor space.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. A device for assembling tools in a tool holder by thermal expansion and preadjustment and measuring of the mounted assembly, the device comprising:

a support frame (1) with an interchangeable tool holding socket (2);

at least one column (3) supporting a dimensional measurement arm (4) and an induction heater (5);

a console (6) for displaying measurements;

a control panel (7); and a device (8) for the precise adjustment of the outwardly extending length of the tool, wherein the dimensional measurement arm (4) is in the form of a support of a projector assembly or camera (9) and episcopic illumination means (10) or diascopic illumination means (10'), or another visualization device for the position of a tool, this assembly being mounted movably along X and Z axes (FIG. 2), which is to say parallel to the axis of the column (3) and perpendicular to this column (3) in the direction of moving toward or away from planes parallel to this latter, without the possibility of direct movement into the field of positioning of the tool holding socket and of the tool and into the field of action of the induction heater (5).

2. The device according to claim 1, further comprising a shank carrier (11) with interchangeable shanks (12).

3. The device according to claim 1, further comprising an extraction gripper movably mounted on the column (3).

4. The device according to claim 1, wherein the device (8) for precise adjustment of the outwardly extending length of the tool comprises a knob (8') opening onto a side or onto the surface of said frame (1).

5. The device according to claim 4, wherein the device (8) for precise adjustment of the outwardly extending length of the tool is a mechanical device with manual drive by the knob (8').

6. The device according to claim 4, wherein the device (8) for precise adjustment of the outwardly extending length of the tool is in the form of an electrical or hydraulic driving device, whose actuation is effected by drive from the knob (8').

* * * * *